United States Patent
Horiuchi

(10) Patent No.: US 6,688,760 B2
(45) Date of Patent: Feb. 10, 2004

(54) LAMP BODY CONTROL SYSTEM

(75) Inventor: Yutaka Horiuchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/310,948

(22) Filed: Dec. 6, 2002

(65) Prior Publication Data

US 2003/0107321 A1 Jun. 12, 2003

(30) Foreign Application Priority Data

Dec. 11, 2001 (JP) .................................... P. 2001-377860

(51) Int. Cl.⁷ ................................................ B60Q 1/12
(52) U.S. Cl. ........................ 362/464; 362/36; 362/37; 315/81
(58) Field of Search ...................... 362/464, 36, 37; 315/81

(56) References Cited

U.S. PATENT DOCUMENTS 5,404,278 A * 4/1995 Shibata et al. .............. 362/464

FOREIGN PATENT DOCUMENTS

| JP | 2-29539 | 6/1990 |
| JP | 6-104432 | 12/1994 |

* cited by examiner

*Primary Examiner*—David Hung Vu
(74) *Attorney, Agent, or Firm*—Arent Fox Kintner Plotkin & Kahn, PLLC

(57) ABSTRACT

A lamp body control system includes a steering angle sensor, a light emitting unit which can change a illuminating direction laterally, a driving unit changing the illuminating direction, a control unit controlling the driving unit based on an output from the steering angle sensor, and a straight driving condition determining unit determining the straight ahead driving condition of a vehicle. The control unit directs the illuminating direction to a direction according to a steering direction and a variation in the steering angle in the event that the variation is larger than a predetermined value, whereas in the event that the variation is equal to or smaller than the predetermined value, the control unit returns the illuminating direction toward a forward direction of the vehicle at a predetermined returning speed until the determining unit determines that the vehicle is in a straight driving condition after an ignition switch is turned on.

6 Claims, 4 Drawing Sheets

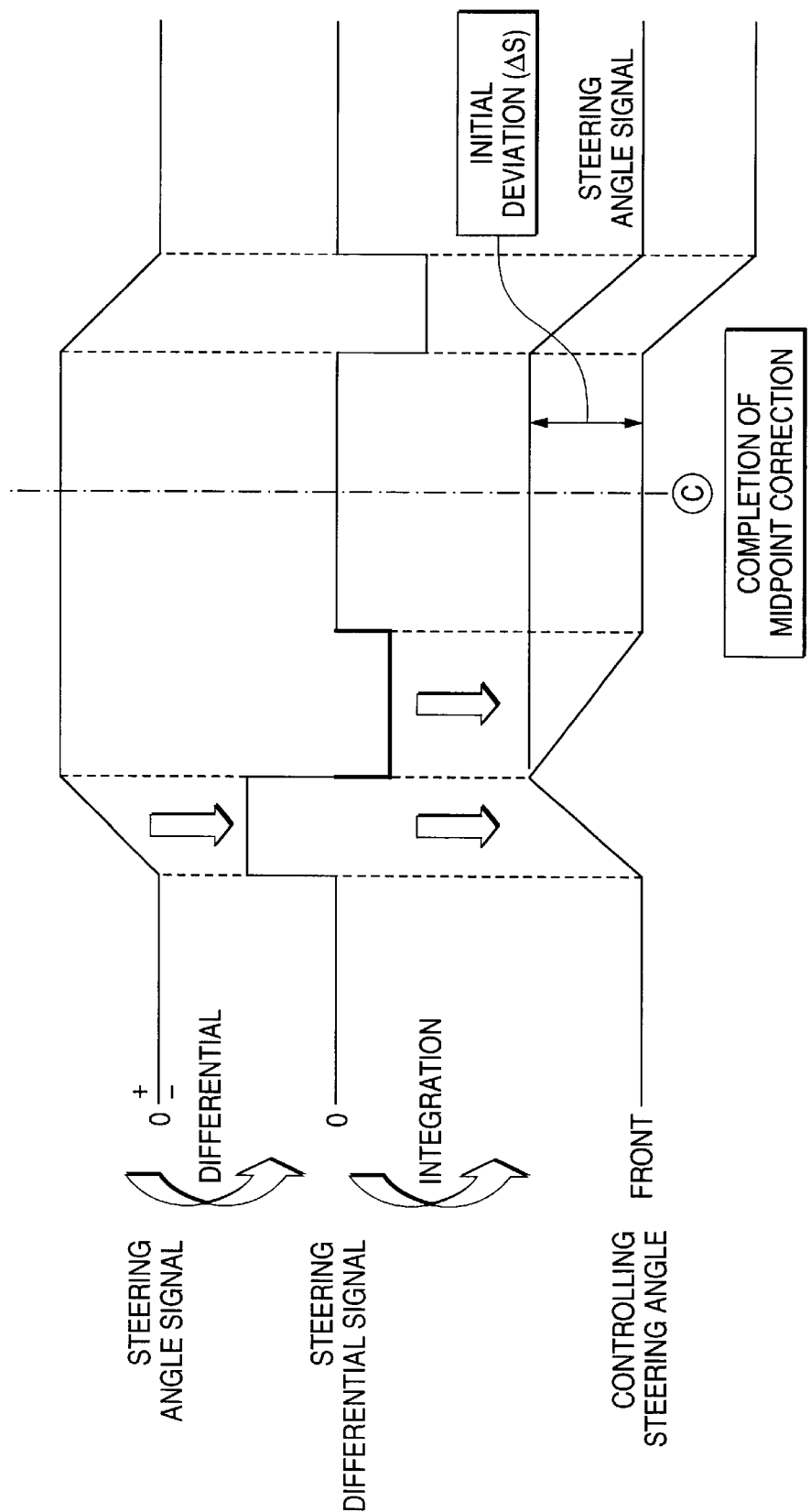

LAMP BODY CONTROL SYSTEM

BACKGROUND OF THE INVENTION

1. Field of the Invention

The present invention relates to a lamp body control system for changing the illuminating direction of lamp bodies according to a steering angle of a vehicle.

2. Description of the Related Art

There has been known a conventional lamp body control system for changing the illuminating direction of lamp bodies equipped on a vehicle according to a steering angle of a vehicle. This lamp body control system is characterized in that a road surface in the traveling direction of the vehicle can be illuminated when the vehicle is running on a curved track. It is a common practice to use an encoder for outputting a pulse corresponding to a turning angle which utilizes an optical sensor or a magnetic sensor as a steering angle sensor for the lamp body control system. Some encoders output a relative angle whereas others output an absolute angle, and either of them are selected for use as required.

In the event that an encoder is used which can detect a relative angle, since a reference position first needs to be detected in implementing the control, an operation such as disclosed in JP-B-2-29539 has been required in which the illuminating direction of lamp bodies is fixed to a direction facing the front of a vehicle until a reference position for a relative angle is detected. In this method, however, since the illuminating direction of the lamp bodies is fixed to the direction facing the front of the vehicle in a condition resulting immediately after the control is initiated in which the reference position for the relative angle has not yet been detected, there is caused a problem that the illuminating direction of the lamp bodies cannot be controlled as in a case where the vehicle is started from a parallel parked condition in which it is parked between vehicles which are parked longitudinally relative to the curb of a road. In addition, there is known a technology such as disclosed in JP-B-6-104432 in which a steering angle when the ignition switch is turned off is stored, and then the control is initiated based on the stored steering angle when the ignition switch is turned on. In this method, however, there is caused another problem that in the event that the steering wheel is operated when the ignition switch is turned off, there is caused a deviation between an actual steering angle and the stored one.

While these problems can be solved by a method in which an absolute angle sensor is used or a method in which an encoder and a computing circuit are energized at all times, in general sensors for detecting an absolute angle are expensive, and a neutral position (or a reference position) needs to be calibrated at least once after a vehicle is produced, these causing a problem that the production costs are increased.

In addition, while a steering angle can be retained and updated by energizing the encoder and the computing circuit at all times, power is consumed at all times and therefore this triggers another problem that the battery goes flat. In addition, there is caused a risk that the reference value is deviated due to disturbances such as erroneous counting and noise.

SUMMARY OF THE INVENTION

The invention was made in view of the situations, and an object thereof is to provide a lamp body control system which utilizes an inexpensive relative angle sensor such as an encoder and which can change the illuminating direction of lamp bodies according to a steering angle immediately after the ignition switch is turned on whereas it consumes no current while the ignition switch is off.

With a view to attaining the object, according to a first aspect of the invention, there is provided a lamp body control system including a steering angle sensor (for example, a steering angle sensor 2 in an embodiment) for detecting a steering angle, a light emitting unit (for example, a lamp body 1 in the embodiment) which can change the illuminating direction thereof at least laterally, a driving unit (a lamp body driving unit 5 in the embodiment) for changing the illuminating direction of the light emitting unit, a control unit (for example, a control unit 6 in the embodiment) for controlling the driving unit based on an output from the steering angle sensor, and a straight ahead driving condition determining unit (for example, a step S13 in the embodiment) for determining the straight ahead driving condition of a vehicle, the lamp body control system being characterized in that the control unit directs the illuminating direction of the light emitting unit to a direction according to a steering direction and a variation in the steering angle in the event that the variation in the steering angle is larger than a predetermined value (for example, steps S3, S11 in the embodiment), whereas in the event that the variation in the steering angle is equal to or smaller than the predetermined value, the control unit return the illuminating direction toward a direction facing the front of the vehicle at a predetermined returning speed (for example, steps S3 to S10 in the embodiment) until the straight ahead driving condition determining unit determines that the vehicle is in a straight ahead driving condition after an ignition switch is turned on.

According to the construction of the first aspect of the invention, since the control unit is constructed to direct the illuminating direction of the light emitting unit to a direction according to a steering direction and a variation in the steering angle in the event that the variation in the steering angle is larger than a predetermined value, whereas in the event that the variation in the steering angle is equal to or smaller than the predetermined value, the control unit returns the illuminating direction toward a direction facing the front of the vehicle at a predetermined returning speed during a period of time from an ignition switch is turned on until the straight ahead driving condition determining unit determines that the vehicle is in a straight ahead driving condition, even in a case where an inexpensive relative angle sensor such as an encoder is used, the illuminating direction can be changed as the vehicle is steered immediately after the ignition switch is turned on. In addition, since there is no need to supply power to the encoder and a computing circuit at all times, there can be provided an advantage that no power is allowed to be consumed when the ignition switch is off.

According to a second aspect of the invention, there is provided a lamp body control system as set forth in the first aspect of the invention, wherein the system further comprises a vehicle speed sensor (for example, a right driven wheel speed sensor 3 or a left driven wheel speed sensor 4 in the embodiment), whereby the returning speed is changed according to a vehicle speed (for example, steps S5, S6, S7 in the embodiment).

According to the construction of the second aspect of the invention, since the vehicle speed sensor is provided, whereby the returning speed is changed according to a vehicle speed, an illuminating direction control can be implemented according to a change in the gazing properties of a driver in conjunction with a change in vehicle speed. In general, since the line of sight of the driver is directed to the front of the vehicle in many cases and the variation in line of sight to lateral directions decreases when the vehicle speed is high, it is effective that the illuminating direction is returned to the direction facing the front of the vehicle at a fast returning speed. In contrast, since the line of sight of the driver is directed to a direction in which the vehicle is steered in many cases when the vehicle is at rest or runs at an extremely low speed as in a case where it is started from a rest, it is effective that the illuminating direction is returned to the direction facing the front of the vehicle at low returning speed.

According to a third aspect of the invention, there is provided a lamp body control system as set forth in the second aspect of the invention, wherein the returning speed when the vehicle speed is equal to or larger than a given value (for example, a compensation Δ1 in the embodiment) is larger than the returning speed when the vehicle speed is smaller than the given value (for example, a compensation Δ2 in the embodiment).

According to the construction of the third aspect of the invention, since the returning speed when the vehicle speed is equal to or larger than the given value is set to be larger than the returning speed when the vehicle speed is smaller than the given value, the control of illuminating direction according to a change in the gazing properties of the driver in conjunction with a change in vehicle speed can be implemented in an ensured fashion.

According to a fourth aspect of the invention, there is provided a lamp body control system as set forth in any of the first to third aspects of the invention, wherein the straight ahead driving condition determining unit determines that the vehicle is in a straight ahead driving condition in the event that a condition continues for a predetermined period of time (for example, steps S13, S15 in the embodiment) in which a difference in rotation between left and right driven wheels (for example, a difference in output between the right driven wheel sensor and the left driven wheel sensor in the embodiment) is equal to or smaller than a certain value.

According to the construction of the fourth aspect of the invention, since the straight ahead driving condition determining unit is constructed so as to determine that the vehicle is in a straight ahead driving condition in the event that a condition continues for a predetermined period of time in which a difference in rotation between left and right driven wheels is equal to or smaller than a certain value, there is provided an advantage that the straight ahead driving condition can be determined in easy and ensured fashions. In addition, with a vehicle equipped with an ABS, since the wheel speed sensors are normally equipped on the vehicle, there is provided an advantage that no additional sensor needs to be installed in the system.

BRIEF DESCRIPTION OF THE DRAWINGS

FIG. 5 is an explanatory view showing the operation of the lamp body controlling system shown in FIG. 1.

DETAILED DESCRIPTION OF THE PREFERRED EMBODIMENTS

Figure 1:
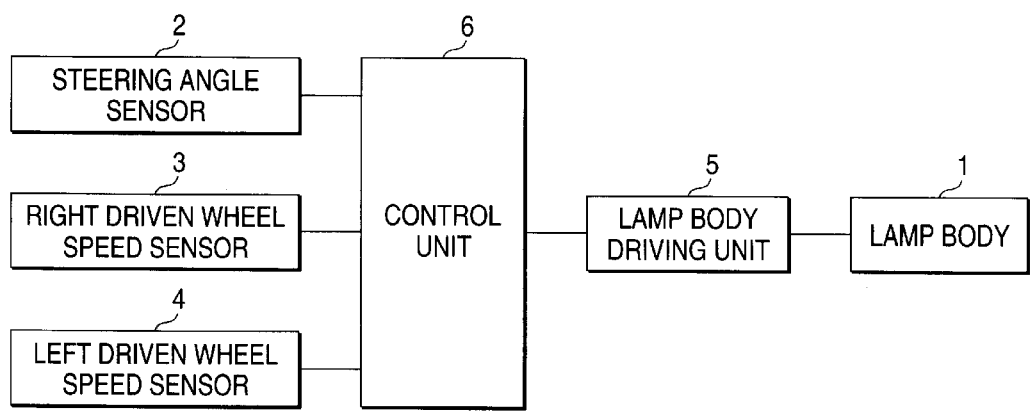
FIG. 1 is a block diagram showing the configuration of an embodiment according to the invention.

Referring to the accompanying drawings, a lamp body control system according to an embodiment of the invention will be described below. FIG. 1 is a block diagram showing the configuration of the embodiment. In the figure, reference numeral 1 denotes a lamp body such as a headlamp or an auxiliary lamp for illuminating the front of a running vehicle. Reference numeral 2 denotes a steering angle sensor for detecting the steering direction and steering angle of a steering wheel. Reference numerals 3, 4 denote driven wheel speed sensors for detecting the rotating speed of left and right driven wheels, respectively. Here, a sensor for detecting the rotating speed v1 of a right driven wheel is a right driven wheel speed sensor 3, and a sensor for detecting the rotating speed v2 of a left driven wheel is a left driven wheel speed sensor 4. The right driven wheel speed sensor 3 and the left driven wheel speed sensor 4 may be structured such as to utilize outputs from sensors for an ABS (Antilock Brake System) which are already fitted on the vehicle. Reference numeral 5 denotes a lamp body driving unit for changing the illuminating direction of the lamp body 1 which can change the illuminating direction at least laterally. The lamp body 1 is biased to be oriented to a direction facing the front of the vehicle at all times by virtue of a force of a spring provided on the lamp body driving unit 5, and when swing laterally the illuminating direction, the lamp body driving unit 5 is driven by a stepping motor. Consequently, when the ignition switch is off, the lamp body 1 is constructed so as to be oriented in the direction facing the front of the vehicle by virtue of the spring force. Reference numeral 6 denotes a control unit for controlling the lamp body driving unit in accordance with the output values of the respective sensors. A controller or CPU provided for controlling other apparatuses equipped on the vehicle may be configured such that part of the capacity thereof is used as the control unit 6.

Here, terms that are used in this specification will be defined as follows. A midpoint correction means a corrective action for aligning a neutral position of a steering wheel with a reference point (a midpoint) for a lamp body illuminating direction in a straight ahead driving condition.

A steering angle signal is a value obtained by counting pulse signals obtained from the steering angle sensor 2 and indicates a value according to a steering amount. In addition, a value when the control is initiated is set to be zero.

A steering angle differential signal means a signal obtained by differentiating the steering angle signal and is used for determining whether or not steering is performed or for calculating a controlling steering angle.

A correction amount means a value that is added to or subtracted from the steering angle differential signal so as to gradually make the value of the controlling steering angle zero. In the event that the steering wheel is held before a midpoint correction is completed, the correction amount is used to gradually make the value of the controlling steering angle zero (to gradually return the illuminating direction of the lamp body to a direction facing the front of the vehicle).

A controlling steering angle means a theoretical value that is used to control the illuminating direction of the lamp body and is obtained by integrating a corrected steering angle differential signal.

Next, the details of controlling implemented by the lamp body control system according to the invention will briefly be described.

Firstly, in the event that the steering wheel is operated, a controlling steering angle is obtained based on a variation of a signal obtained from the steering angle sensor (a steering angle differential signal) despite whether or not a midpoint correction has been completed to thereby control the illuminating direction of the lamp bodies. As this occurs, no correcting process is carried out, and the controlling steering angle becomes a value in proportion to a signal obtained from the steering sensor.

In contrast, in the event that the steering wheel is held before a midpoint correction is completed, firstly whether or not the controlling steering angle is zero is determined, and in the event that it is determined that the controlling steering angle is not zero, the steering angle differential signal is corrected such that the controlling steering angle gradually becomes zero. By this correction the illuminating direction of the lamp bodies is controlled so as to be returned to the direction facing the front of the vehicle at all times when the steering wheel is not operated. In addition, the correction amount is changed by the vehicle speed, and a correction amount $\Delta 1$ when the vehicle speed is high is set to be a larger value than a correction amount $\Delta 2$ when the vehicle speed is low or the vehicle is at rest.

In contrast, even in the event that the steering wheel is held, no correction is made to the steering angle differential signal after an midpoint correction is completed, and the illuminating direction of the lamp bodies continues to be directed to an illuminating direction according to the steering without being returned to the direction facing the front of the vehicle.

Figure 3:
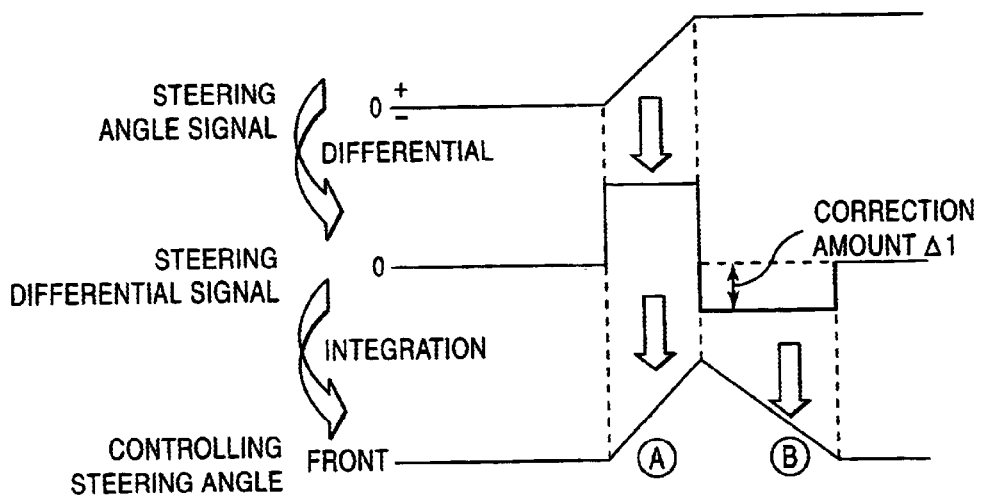
FIG. 3 is an explanatory view showing the operation of the lamp body controlling system shown in FIG. 1.
Figure 4:
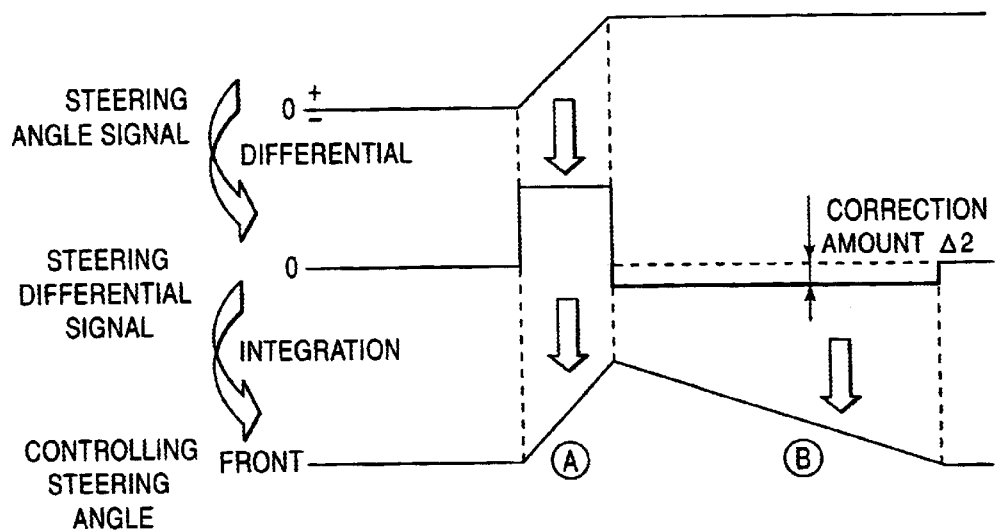
FIG. 4 is an explanatory view showing the operation of the lamp body controlling system shown in FIG. 1.

Shown in FIGS. 3, 4 is a relationship between the steering signal from the steering sensor 2 and the controlling steering angle when the steering wheel is operated before a midpoint correction is implemented. FIG. 3 shows a relationship among the steering angle signal, the steering angle differential signal and the controlling steering angle when the vehicle is running at a speed equal to or larger than a given value, and FIG. 4 shows a relationship among the steering angle signal, the steering angle differential signal and the controlling steering angle when the vehicle is at rest or is running at an extremely low speed. As shown in the figures, the actual steered amount and the controlling steering angle when the steering wheel is operated correspond to each other. For example, in the event that the vehicle is started from the parallel parked condition, a controlling steering angle is generated based on the steering direction and steering amount of the steering wheel, and the illuminating direction of the lamp bodies is determined by this controlling steering angle so generated (conditions indicated by (A) in FIGS. 3, 4). Then, in the event that the vehicle is started with the steering wheel being held, the controlling steering angle is controlled so as to gradually return to the midpoint (the front of the vehicle) (conditions indicated by (B) in FIGS. 3, 4). However, a speed at which the controlling steering angle returns to the midpoint becomes slower when the vehicle is at rest or is running at an extremely low speed than when the vehicle speed is equal to or larger than the given value.

Namely, as indicated by (B) in FIGS. 3, 4, the inclination of the controlling steering angle becomes more moderate in FIG. 4 than in FIG. 3. This corrective action is performed by adding or subtracting a correction amount according to the vehicle speed to or from the steering angle differential signal which is obtained by differentiating the steering angle signal. Thus, when the vehicle is running, the illuminating direction is returned to the front of the vehicle quickly, whereas the illuminating direction is returned to the direction facing the front of the vehicle at slow speed when the vehicle is at rest or is running at extremely low speed. However, in the event that the steering wheel is steered further during these processes, as shown by (A) in FIGS. 3, 4, the controlling steering angle is outputted according to the direction in which the steering wheel is steered.

FIG. 5 is a diagram showing an operation resulting after a midpoint correction has been implemented. In this figure, assuming that a midpoint correction is completed at point (C), since the vehicle is in the straight ahead driving condition at point (C), an output from the steering sensor 2 is deviated by $\Delta S$ when the ignition switch is turned on. Since the controlling steering angle at that time is zero, the illuminating direction of the lamp bodies is oriented to the front of the vehicle. Then, since this deviation $\Delta S$ continues to be held onward until the ignition switch is turned off, the controlling steering angle is allowed to function such that the controlling steering angle becomes zero when the vehicle is running straight ahead.

Next, conditions for the midpoint correction will be described.

Since a steering angle $\delta$ when turning is in inverse proportion to a turning radius $\rho$, in order to calibrate so that $\delta=0$, the steering angle may be made zero when the vehicle is running straight ahead ($\rho=\infty$). Since the turning radius $\rho$ cannot be obtained directly, the turning radius $\rho$ is obtained from the rear wheel speeds in this embodiment. A relationship between left and right rear wheel speeds v1, v2 and the turning radius $\rho$ at the time that the vehicle is not largely slipped, that is, normal driving is expressed by:

[Expression 1] (1)

$$\rho = \frac{(v1+v2)/2}{|v1-v2|} \cdot l = \frac{V}{\Delta V} \cdot l$$

(1=tread=distance between the rear wheels)

In addition, the turning angular speed $\gamma$ is expressed by:

[Expression 2] (2)

$$|\gamma| = \frac{(v1-v2)}{l} = \frac{\Delta V}{l}$$

Thus, a condition for a certain magnitude of turning radius when the vehicle is not turning (the angular speed is low) may be satisfied that a right side number of Expression (1) is equal to or larger than a certain value whereas a right side number of Expression (2) is equal to or smaller than a certain value. While Expression (2) becomes zero theoretically when the vehicle is running straight ahead, since there exists a tolerance between wheel speeds, assuming that this tolerance is $V_E$, there is no other way but to evaluate Expression (2) using Expression (3) below,

[Expression 3] (3)

$$\frac{\Delta V}{l} \leq V_E$$

As this occurs, since there is a possibility from Expression (1) that the turning radius $\rho$ becomes larger as the vehicle speed reduces, a condition for steering angle midpoint correction is that the right side number of Expression (1) is equal to or larger than a certain value or V is equal to or larger than a certain value while satisfying Expression (3).

Next, referring to FIG. 2, a detailed operation of the lamp body control system shown in FIG. 1 will be described. FIG.

2 is a flow chart showing the operation of the control unit 6 shown in FIG. 1. A process shown in FIG. 2 is activated after the ignition switch of the vehicle is turned on and is repeated for a certain period of time (for example, 10 msec).

Firstly, the control unit 6 reads an output from the steering angle sensor 2 and retains therein the read sensor output value (step S1). Following this, the control unit 6 determines whether or not a midpoint correction has been completed by referring to a flag (to be set in step S16, which will be described later) indicating that a midpoint correction has already been completed (step S2). As a result of the determination, in the event that a midpoint correction has already been completed, since an output value from the steering angle sensor 2 is used without being corrected when generating a controlling steering angle, the flow advances to step S11. In step S11, a controlling steering angle is obtained which is used in an illuminating direction changing operation which is normally carried out. A controlling steering angle obtained this time in step S11 is such as to be obtained based on an output value from the steering angle sensor 2 without being corrected and is obtained by adding a difference between an output value outputted this time from the steering angle sensor 2 and the previous output value from the steering angle sensor 2 to the previous controlling steering angle.

In contrast, in the event that it is determined in step S2 that a midpoint correction has not yet been completed, the control unit 6 determines whether or not a difference (a variation in steering angle) between the current steering angle value and the previous steering angle value is zero or whether or not the steering angle differential value is zero (step S3). As a result of the determination, in the event that it is determined that the difference (a differential value) between the current steering angle value and the previous steering angle value is not zero, then the flow advances to step S11.

In the event that it is determined in step S3 that the difference (the differential value) between the current steering angle value and the previous steering angle is zero, or in the event that the steering wheel is held, the control unit 6 determines whether or not a controlling steering angle at the current point in time is zero (step S4). As a result of the determination, in the event that it is determined that the controlling steering angle is zero, since there is no need to correct the controlling steering angle, then the flow advances to step S11, and it is ensured that the controlling steering angle is zero. In contrast, in the event that the controlling steering angle is not zero but the difference (the differential value) between the current steering angle value and the previous steering angle value is zero, the control unit 6 determines whether the vehicle is running or at rest or is running at extremely slow speed (step S5). This determination is carried out based on output values from the left and right wheel speed sensors 3, 4 or an output value from a vehicle speed sensor (not shown).

In the event that the control unit 6 determines that the vehicle is running, the correction amount is set to Δ1 (step S6), whereas in the event that the control unit 6 determines that the vehicle is at rest or is running at extremely slow speed (for example, slower than 5 km/h), the correction amount is set to Δ2 which is smaller than Δ1 (step S7). Here, the correction amount Δ1 is, for example, 10°/sec, and in the event that an execution interval of the process shown in FIG. 2 is 10 msec, a single process provides a correction of 0.1°. In addition, the correction amount Δ2 is, for example, 1°/sec, and in the event that the execution interval is similarly 10 msec, a single process provides a correction of 0.01°. These Δ1, Δ2 are the returning speed claimed in here.

Thus, the reason why the correction amount is set Δ1>Δ2 is because in general when the vehicle speed is fast since the line of sight of the driver is directed toward the direction facing the front of the vehicle in many cases and a variation in the line of sight in lateral directions becomes small, it is effective that the illuminating direction is returned to the direction facing the front of the vehicle at high speed, whereas when the vehicle is at rest or is running at extremely slow speed as occurring when the vehicle is started to move since the line of sight of the driver is directed to the steering direction in many cases, it is effective that the illuminating direction is returned to the midpoint at slow speed.

Next, the control unit 6 determines whether the controlling steering angle is positive or negative (step S8), and in the event that the controlling portion 6 determines that the value of the controlling steering angle is "positive," the correction amount is subtracted from the previous controlling steering angle so as to make the remaining value the present controlling steering angle (step S9), and in contrast, in the event that the control unit 6 determines that the value of the controlling steering angle is "negative," the correction amount is added to the previous controlling steering angle so as to make the resulting value the present controlling steering angle (step S10). The controlling steering angle obtained by the control unit 6 is outputted to the lamp body driving unit 5 in steps S9, S10, S11, whereby the change in illuminating direction of the lamp bodies is controlled.

Next, the control of the midpoint correction will be described. Since the vehicle needs to run at a speed equal to or larger than a given value in order to implement a midpoint correction, firstly the control unit 6 determines whether or not the vehicle speed has reached a midpoint correction regulating speed (step S12). This determination is implemented based on output values from the left and right driven wheel speed sensors 3, 4 or an output value from the vehicle speed sensor (not shown), and for example, whether or not the regulating speed is reached is determined by determining whether or not the vehicle speed is equal to or larger than 35 km/h. As a result of the determination, in the event that the control unit 6 determines that the vehicle speed has not yet reached the regulating speed, the present process is terminated without setting the flag indicating that the midpoint correction is completed.

Next, in the event that the control unit 6 determines in step S12 that the vehicle speed is equal to or larger than the regulating speed, the control unit 6 then determines whether or not the difference in speed between the left and right driven wheels is equal to or smaller than a certain value, and in the event that the control unit 6 determines that the difference is equal to or smaller than the certain value, the control unit 6 determines that the vehicle is in the straight ahead running condition (step S13). This determination is implemented by reading an output value from the right driven wheel speed sensor 3 and an output value from the left driven wheel speed sensor 4 and determining whether or not a difference between the two output values is equal to or smaller than the certain value (for example, 0.1 km/h). This is because in the event that the difference in speed between the left and right driven wheels is substantially equal to each other and can be regarded as zero, it is determined that the vehicle is in the straight ahead running condition. Since normally the wheel speed sensors output pulses according to the number of rotations of the wheels, a speed corresponding to the vehicle speed is converted from the results of counting the pulses, and whether or not the speed so converted is 0.1 km/h or less is determined. In contrast to this, the vehicle may be determined as being in the straight ahead driving condition when a threshold value which is obtained in advance for the difference in the number of pluses between the left and right driven wheels at which the converted speed corresponds to 0.1 km/h is determined to be equal to or smaller than the certain value. As a result of the determination, in the event that the difference in speed is larger than the certain value, the present process is terminated without setting the flag indicating that the midpoint correction is completed.

Next, in the event that the control unit 6 determines in step S13 that the difference in speed between the left and right driven wheels is equal to or smaller than the certain value, the control unit 6 then determines whether or not the controlling steering angle obtained in any of steps S9, S10, S11 is zero (step S14). As a result of the determination, in the event that the control unit 6 determines that the controlling steering angle is not zero, since the illuminating direction of the lamp bodies is not directed to the direction facing the front of the vehicle, the present process is terminated without setting the flag indicating that the midpoint correction is completed.

In the event that the control unit 6 determines in step S14 that the controlling steering angle is zero, the control unit 6 determines whether or not a certain period of time has elapsed since a condition similar to the previous one was attained (step S15). This determination is implemented by determining whether or not the certain period of time (for example, 2 sec) has elapsed since the conditions such as "the vehicle speed is equal to or larger than the midpoint correction regulating speed", "the difference in speed between the driven wheels is equal to or smaller than the certain value" and "the controlling steering angle is zero" were attained. As a result of the determination, in the event that the control unit 6 determines that the certain time has not elapsed, the present process is terminated without setting the flag indicating that the midpoint correction is completed.

In the event that the control unit 6 determines in step S15 that the certain period of time has elapsed since the conditions for the midpoint correction were established, the present process is terminated with the flag indicating that the midpoint correction is completed being set (Step S16). Since this flag is reset only when the ignition switch is turned on, the processes in steps S3 to S10 are not executed after the flag indicating the completion of the midpoint correction is set. Namely, the processes in steps S3 to S10 are such as to be executed only during a time from the ignition switch is turned on until the straight ahead driving condition is detected for the first time.

Thus, the ensured determination of the midpoint correction is improved by determining in steps S12, S13 that the vehicle is not turning, determining in step S14 that the illuminating direction of the lamp bodies is directed to the direction facing the front of the vehicle, and further waiting in step S15 until the certain period of time has elapsed since the conditions determined in the previous steps were established. Since step S14 functions to make a timing zero (the mid point) at all times when the process in which the controlling steering angle gradually approaches zero and finally becomes zero (steps S13 to 10) and the normal process (step S11) changeover, the step S14 also provides an advantage that the controlling steering angle is abruptly changed over.

Thus, the illumination angle can be changed according to the steering of the vehicle quickly from the condition in which the ignition switch is turned on even using the inexpensive steering angle such as the relative angle encoder. In addition, even if a midpoint deviation of the steering angle is generated due to the aged deterioration, the lamp bodies can be corrected so as to illuminate the front of the vehicle in the straight ahead driving condition.

Note that while whether or not the steering wheel is operated is determined by determining whether or not the difference between the present steering angle value and the previous steering angle value is zero in step 3 in this embodiment, the determination may be implemented by comparing a predetermined value which is obtained from the wobbling of steering when driving straight ahead and the variation of the steering angle (the difference between the present steering angle value and the previous steering angle value).

In addition, instead of determining the straight ahead driving condition by the difference in speed between the driven wheels, whether the vehicle is driving straight ahead or rounding a bend may be determined according to output values from a yaw rate sensor or a lateral G sensor which are provided on the vehicle.

Figure 2:
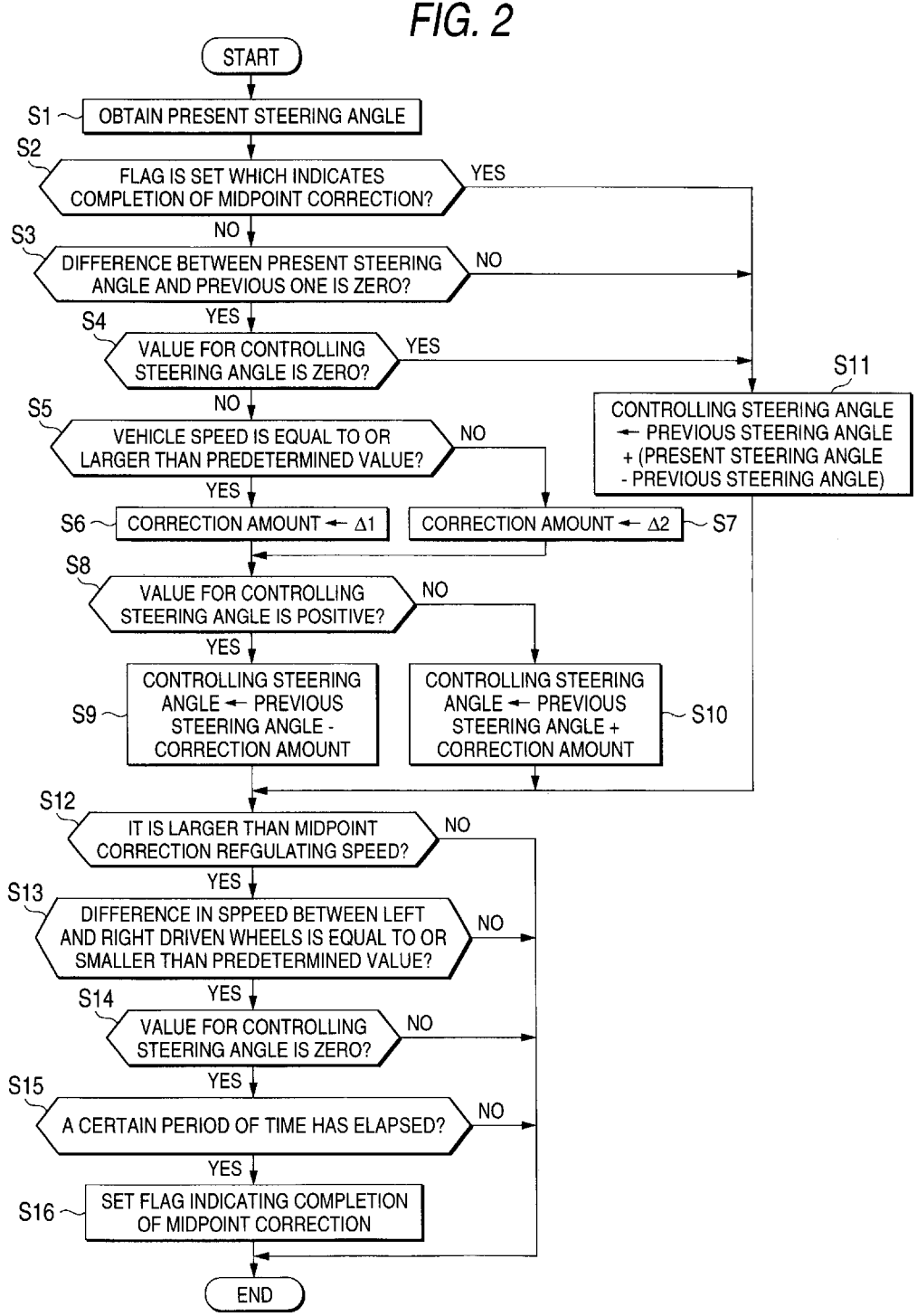
FIG. 2 is a flow chart showing the operation of a lamp body controlling system shown in FIG. 1.

In addition, the process of controlling the illuminating direction of the lamp bodies may be implemented by recording a program for realizing the function of the process shown in FIG. 2 on a recording medium that can be read by a computer, and making a computer system read and execute the program recorded on the recording medium. Here, note that the "computer system" includes an OS and hardware such as peripheral apparatuses. In addition, the "recording medium that can be read by a computer" means recording devices such as a portable recording medium including flexible disks, optical or magnetic disks, ROM's, CD-ROM's, and a hard disk incorporated in the computer system.

In addition, the program may be transferred from the computer system incorporating therein the program to another computer system via a transfer medium or a transfer wave in the transfer medium. Here, the "transfer medium" for transferring the program means a medium having a function to transfer information such as a network (a communication network) such as an internet or communication lines (communication wires) such as telephone lines. In addition, the program may be such as to realize part of the function. Furthermore, the program may be such as to be realized in combination with a program that has already been recorded on the computer system or a so-called differential file (a differential program).

As has been described heretofore, according to the first aspect of the invention, since the control unit is constructed to direct the illuminating direction of the light bodies to a direction according to the steering direction and the variation in the steering angle in the event that the variation in the steering angle is larger than the predetermined value, whereas in the event that the variation in the steering angle is equal to or smaller than the predetermined value, the control unit returns the illuminating direction toward the direction facing the front of the vehicle at the predetermined returning speed during the period of time from the ignition switch is turned on until the straight ahead driving condition determining means determines that the vehicle is in the straight ahead driving condition, even in a case where the inexpensive relative angle sensor such as the encoder is used, the illuminating direction can be changed as the vehicle is steered immediately after the ignition switch is turned on. In addition, since there is no need to supply power to the encoder and the computing circuit at all times, there can be provided an advantage that no power is allowed to be consumed when the ignition switch is off.

According to the second aspect of the invention, since the vehicle speed sensor is provided, whereby the returning speed is changed according to the vehicle speed, the illuminating direction control can be implemented according to a change in the gazing properties of the driver in conjunction with a change in vehicle speed.

In general, since the line of sight of the driver is directed to the front of the vehicle in many cases and the variation in line of sight to lateral directions decreases when the vehicle speed is high, it is effective that the illuminating direction is returned to the direction facing the front of the vehicle at fast returning speed. In contrast, since the line of sight of the driver is directed to a direction in which the vehicle is steered in many cases when the vehicle is at rest or runs at extremely low speed as in a case where it is started from a rest, it is effective that the illuminating direction is returned to the direction facing the front of the vehicle at low returning speed.

According to the third aspect of the invention, since the returning speed when the vehicle speed is equal to or larger than the given value is set to be larger than the returning speed when the vehicle speed is smaller than the given value, the control of illuminating direction according to a change in the gazing properties of the driver in conjunction with a change in vehicle speed can be implemented in an ensured fashion.

According to the fourth aspect of the invention, since the straight ahead driving condition determining unit is constructed so as to determine that the vehicle is in a straight ahead driving condition in the event that the condition continues for the predetermined period of time in which the difference in rotation between the left and right driven wheels is equal to or smaller than the predetermined value, there is provided an advantage that the straight ahead driving condition can be determined in easy and ensured fashions. In addition, with a vehicle equipped with an ABS, since the wheel speed sensors are normally equipped on the vehicle, there is provided an advantage that no additional sensor needs to be installed in the system.

What is claimed is:

1. A lamp body control system comprising:

a steering angle sensor for detecting a steering angle;

a light emitting unit capable of changing a illuminating direction thereof at least laterally;

a driving unit for changing the illuminating direction of said light emitting unit;

a control unit for controlling said driving unit based on an output from said steering angle sensor; and a straight ahead driving condition determining unit for determining a straight ahead driving condition of a vehicle, wherein, until said straight ahead driving condition determining unit determines that said vehicle is in the straight ahead driving condition after an ignition switch is turned on, said control unit directs the illuminating direction of said light emitting unit to a direction according to a steering direction and a variation in the steering angle in the event that the variation in the steering angle is larger than a predetermined value, whereas in the event that the variation in the steering angle is equal to or smaller than said predetermined value, said control unit returns the illuminating direction toward a direction facing the front of said vehicle at a predetermined returning speed.

2. The lamp body control system as set forth in claim 1, further comprising:

a vehicle speed sensor for detecting a vehicle speed, wherein said returning speed is changed according to the vehicle speed.

3. The lamp body control system as set forth in claim 2, wherein said returning speed when the vehicle speed is equal to or larger than a given value is larger than said returning speed when the vehicle speed is smaller than said given value.

4. The lamp body control system as set forth in claim 1, wherein said straight ahead driving condition determining unit determines that said vehicle is in the straight ahead driving condition in the event that a condition in which a difference in rotation between left and right driven wheels is equal to or smaller than a certain value continues for a predetermined period of time.

5. The lamp body control system as set forth in claim 1, wherein said steering angle sensor is constructed by an encoder outputting a relative angle.

6. The lamp body control system as set forth in claim 1, wherein when the control is initiated immediately after the ignition switch is turned on, a steering signal obtained from said steering angle sensor is set to be zero.

* * * * *